Sept. 24, 1935.  C. H. KINDL ET AL  2,015,453

SHOCK ABSORBER

Filed June 21, 1933

INVENTORS
EDWIN F. ROSSMAN
CARL H. KINDL
BY
*Spencer, Hardman & Dehr*
ATTORNEYS

Patented Sept. 24, 1935

2,015,453

UNITED STATES PATENT OFFICE 2,015,453

SHOCK ABSORBER

Carl H. Kindl and Edwin F. Rossman, Dayton, Ohio, assignors, by mesne assignments, to General Motors Corporation, Detroit, Mich., a corporation of Delaware Application June 21, 1933, Serial No. 676,776

15 Claims. (Cl. 188—88)

This invention relates to improvements in hydraulic shock absorbers and particularly the control devices for such shock absorbers.

It is among the objects of the present invention to provide an hydraulic shock absorber capable of adjusting itself automatically in accordance with the nature of the roadbed over which the vehicle is being operated.

A further object of the present invention is to utilize the fluid pressure built up within the shock absorber as the motive power for making such automatic adjustment.

Another object of the invention is to control the application of such motive power by a device actuated in response to accelerative movements of the shock absorber itself.

Further objects and advantages of the present invention will be apparent from the following description, reference being had to the accompanying drawing, wherein a preferred embodiment of one form of the present invention is clearly shown.

Figure 1:
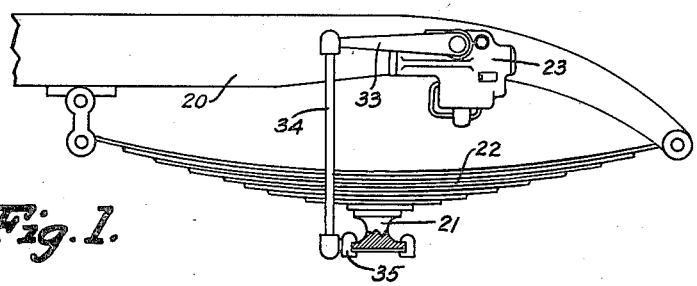
Fig. 1 is a fragmentary side view of a vehicle chassis, a shock absorber equipped with the present invention being shown applied thereto.

Referring to the drawing, the numeral 20 designates the frame of the vehicle which is supported upon the vehicle axle 21 by the vehicle springs 22.

The shock absorber, designated as a whole by the numeral 23, comprises a casing 24 providing a fluid reservoir 25 and a cylinder 26. An opening 27 provides communication between the reservoir and the cylinder.

Within the cylinder a fluid displacement member or piston 28 is provided forming two fluid displacement chambers 29 and 30, the chamber 29 being termed the "spring compression control chamber" and the chamber 30 the "spring rebound control chamber". The piston 28 comprises two oppositely disposed head portions 28a and 28b. Each head portion has a passage 28c in which a valve-seat is provided, and in each passage a ball check valve 28d is urged into normal engagement with the valve-seat to close the passage, by a spring 28e. These valves act as replenishing elements, being adapted to permit fluid to flow into their respective displacement chambers 29 or 30 in order to compensate for any losses of fluid within said chambers or their corresponding ducts, such losses occurring as a result of leaks past the piston.

The piston is operated by a rocker lever 31 carried by and attached to the rocket shaft 32. This shaft is journalled in the casing 24, one end thereof extending outside the casing and having the shock absorber operating arm 33 secured thereto. The free end of this arm is swivelly attached to one end of a link 34, the opposite end of said link being anchored to the axle 21 by the attaching member 35.

Figure 2:
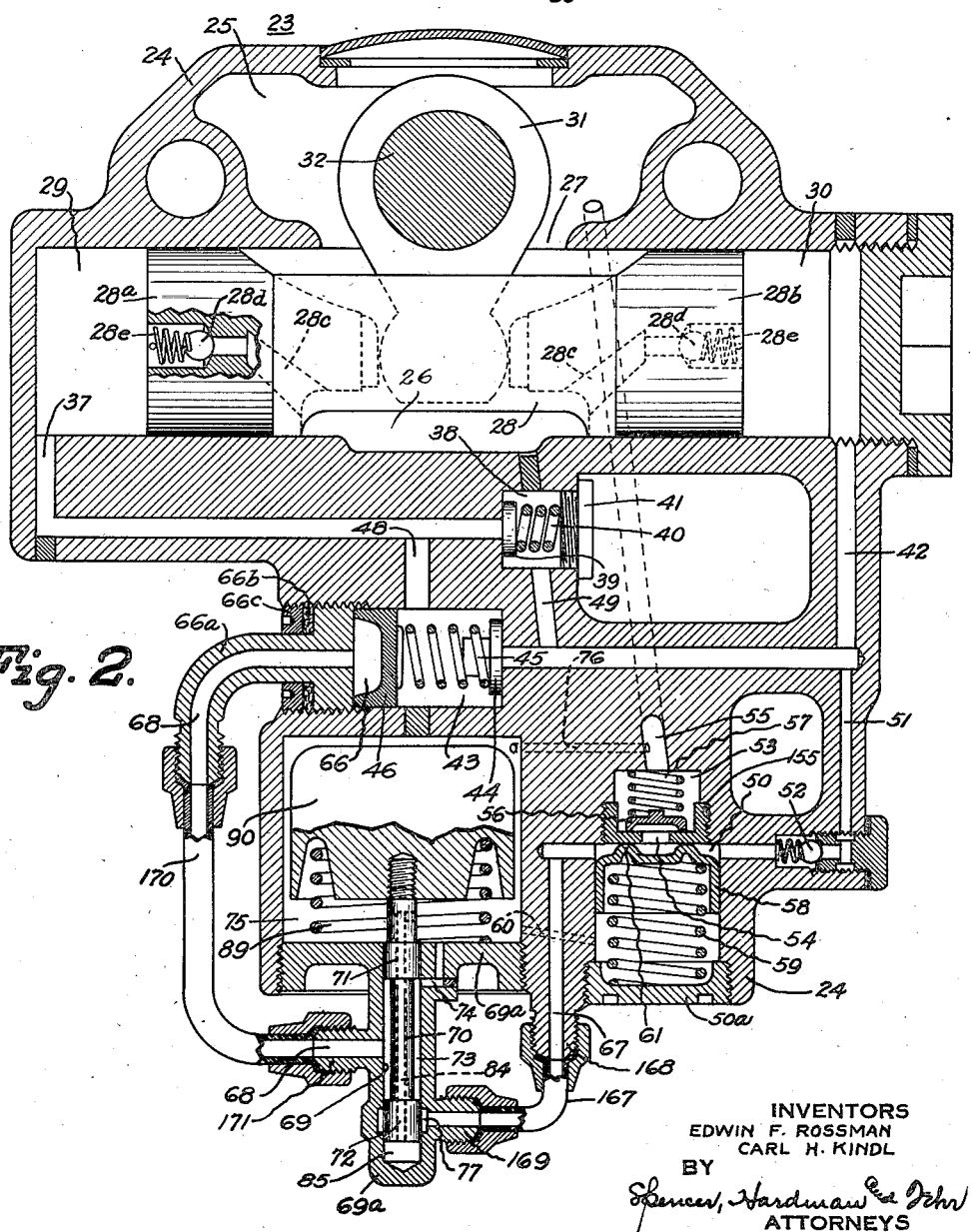
Fig. 2 is a sectional view showing the shock absorber and its operating parts. Certain elements of the device are shown in elevation for the sake of clearness.

From the above description of the mechanism it will be seen that upward movement of the axle 21, toward frame 20, results in a clockwise rotation of the arm 33 and consequently shaft 32 and rocker lever 31, resulting in a movement of the piston 28 toward the left as regards Fig. 2. Due to this movement of the piston, any fluid within the chamber 29 will have pressure exerted thereupon and will consequently be forced from said chamber. Due to the movement of the axle 21 toward frame 20, vehicle springs 22 will be compressed. In response to the rebounding movement of springs 22 that is, their return toward normal load position, the axle 21 moving away from frame 20 rotates arm 33 and therefore shaft 32 and rocker lever 31 in a counterclockwise direction, resulting in a movement of the piston 28 toward the right as regards Fig. 2 and thus exerting a pressure upon the fluid in the rebound control chamber 30 to force the fluid from this chamber.

The shock absorber is provided with ducts which connect the chambers 29 and 30 whereby fluid is transferred between said chambers in response to piston movements back and forth. Fluid flow control devices are provided in said ducts to regulate fluid flow whereby the shock absorber will resist movement of the axle 21 toward and away from the frame 20.

Referring to Fig. 2, duct 37 leading from chamber 29 discharges into a valve chamber 38. The flow through duct 37, however, is controlled by the valve 39 which is normally urged to close duct 37 by a spring 40 interposed between valve 39 and a plug 41 secured in the open end of chamber 38. A similar duct 42 leads from the rebound control chamber 30 into the valve chamber 43, communication between the duct and valve chamber being normally shut off by the valve 44 which is urged into its normal closing position by spring 45 interposed between the valve 44 and a piston 46 slidably supported within the valve chamber 43. A cross passage 48 connects duct 37 with the valve chamber 43 and a similar cross passage 49 connects duct 42 with the valve chamber 38. The outer end of chamber 43 is interiorly threaded to receive a pipe connector 66a which not only provides a conduit leading from the chamber 43 but also a stop against which the piston 46 is yieldingly urged by spring 45. A packing 66b is clamped against the member 66a by a packing nut 66c to prevent fluid leaks at this point.

From the description of this portion of the shock absorber it may clearly be seen that when fluid is forced from the chamber 29 by movement of the piston 28 toward the left as regards Fig. 2, it will enter duct 37 and in passing through passage 48 into chamber 43 it will exert pressure upon valve 44 to assist spring 45 in holding said valve to its duct closing position and consequently no flow from duct 37 can occur in this direction but, when the fluid pressure is sufficient to overcome the effect of spring 40 to hold valve 39 in its duct closing position, then said valve 39 will be moved to permit fluid from duct 37 to flow into chamber 38 and from said chamber through cross passage 49 and duct 42 into the rebound control chamber 30 which, by the movement of the piston 28 toward the left is being increased in area.

In response to the reverse movement of the piston so that pressure is exerted upon the fluid in chamber 30, a flow from said chamber will obtain through duct 42, the fluid pressure moving valve 44 from its seat to permit a flow into chamber 43 from where the fluid will flow through cross passage 48, duct 37 into the spring compression control chamber 29. Under these circumstances valve 39 will be urged upon its seat by both the spring 40 and the pressure from duct 42 opening through cross passages 49 upon the exhaust side of valve 39.

Experiments have taught that most discomfort in the ride of a vehicle, and particularly an automobile, is caused by a sudden rebounding movement of the springs 22 which tend to thrust the vehicle body, supported on frame 20, upwardly. The present shock absorber has been designed with a control device particularly adapted to control such rebound movement of the springs automatically and in accordance with the nature of the road over which the vehicle is being operated. For this reason applicants prefer to adjust the fluid flow control device which controls the rebound flow, or more particularly the flow of fluid from the rebound chamber 30. This control device is the valve designated by the numeral 44.

In order to obtain such control applicants have provided a storage chamber 50 in their shock absorber, connected with the duct 42, leading from the rebound chamber 30, through a fluid passage 51. In this passage there is provided a spring-loaded check valve 52 which permits fluid to flow from duct 42 through passage 51 into the storage chamber 50, but permits no return flow from the storage chamber into the duct 42. A valve chamber 53 communicates with the storage chamber 50 through a port 54 formed in the partition 155 which is screw-threaded into the open end of chamber 53, said partition providing a seat for the valve 56. Valve chamber 53 is in turn connected with the reservoir 25 through any suitable fluid passage as designated by the numeral 55. Normally communication between storage chamber 50 and the valve chamber 53 is cut off by a spring-loaded valve 56, the pressure of spring 57 on said valve being such that valve 56 will open communication between chambers 50 and 53 only after a predetermined fluid pressure is built up within the chamber 50. A piston 58 is slidably supported within the chamber 50 normally urged into the normal position as shown, by spring 59. The space behind piston 58 is connected with the chamber 75 through a passage 60, so that no fluid is trapped behind the piston to impede its movement from normal position.

Piston 58 has humps 61 which engage the upper wall of chamber 50 for the purpose of at all times providing a space between the upper surface of the piston portion 58 and the upper, inner wall of the chamber 50.

The storage chamber or reservoir 50 has its open end closed by a plug 50a. It is in communication with a chamber 66 provided in the valve chamber 43, on the back side of piston 46 through fluid passages 67 and 68, both said fluid passages leading into a cylindrical valve chamber 69 in which the control valve 70 is slidably supported. The chamber 69 is formed in a tubular extension of the cover plate 69a, which cover plate is threadedly received by the chamber 75 in which the weight 90 is located. This control valve 70, as may clearly be seen in Fig. 2, has two head portions 71 and 72 slidably fitting within the chamber 69, the portion between said head portions 71 and 72 being of reduced diameter for the purpose of providing an annular space 73 within the chamber 69 between said two head portions. Normally the head portion 72 is positioned within the chamber 69 so that communication between passage 67 and said chamber 69 is completely cut off. Passage 68, however, is at all times in communication with the annular space 73 in the chamber 69. The head portion 71 of valve 70 is so positioned normally relatively to a shunting passage 74 that when the valve 70 is in this position, said shunting passage 74 connects annular space 73 with a chamber 75 in which the inertia mass control element 90 is housed. This chamber 75 in turn has a passage 76 leading therefrom to the reservoir 25. In the present instance passage 76 is in communication with passage 55 leading from the valve chamber 53 to the reservoir 25. The duct 67 leads directly into an annular recess 77 in chamber 69, thus providing an annular space around the entire peripheral surface of the valve head 72, consequently rendering said valve head unaffected by fluid pressure stored within the storage chamber 50. This annular space is normally cut off from space 73 by valve head 72. Duct 67 is completed by the pipe 167 connecting the nipple 168 on the casing 24 with the nipple 169 on the member 69a. The duct 68 connecting chambers 66 and 73 comprises the pipe connector 66a, the pipe 170 and nipple 171 on member 69a.

The inertia mass control element 90, commonly termed the "inertia weight", is held in balanced position by a spring 89 interposed between the weight and member 69a. The valve 70 is attached to said weight so that when the weight is in balanced position, valve 70 is held in the position shown in Fig. 2 in which duct 67 is normally cut off from duct 68, but duct 68 in turn is in normal communication with the reservoir 25 through the passages described heretofore. In order that no fluid may be trapped within the space 85, between the lower end of valve 70 and the adjacent casing portion, which would resist the downward movement of the valve 70, a passage 84 longitudinally of the valve 70 connects this chamber 85 with the chamber 75 so that it may be said that chamber 85 is actually in communication with the reservoir 25.

The shock absorber so far described actuates in the following manner:

When the vehicle is being operated along a highway and one of its wheels, not shown, but supported by axle 21, strikes an obstruction in the highway, it results in a sudden upward thrust of the axle 21. Due to such axle movement, spring 22 is compressed and piston 28 is moved toward the left. The fluid flow from chamber 29 to the chamber 30, as has been described heretofore, is restricted by the spring-loaded valve 39 and consequently such restriction to the fluid flow will result in a resistance offered by the shock absorber to this spring compression movement.

As a result also of this sudden upward thrust of axle 21, the body, carried by frame 20, will also be thrust upwardly. The compressed vehicle springs 22 will tend to exert an additional upward thrust on the frame 20 due to the fact that the vehicle wheels are on the roadway and no downward thrust of the springs may obtain and consequently the frame 20 with its attached body will be thrown violently upwardly, the magnitude of such thrust being dependent of course upon the character of the obstruction met. As the frame 20 and axle 21 separate, the piston, as has been described, is moved toward the right as regards Fig. 2 and fluid is forced from chamber 30 into chamber 29. This fluid flow is restricted by the spring-loaded valve 44 and consequently the shock absorber will offer resistance to such separating movements of the frame and axle. If the upward thrust of the frame 20 is excessive, however, the normal restriction of valve 44 due to the action of spring 45 will not be sufficient, and applicants have found it desirable to increase the pressure of spring 45 upon valve 44, thereby increasing the resistance of valve 44 to the fluid flow and consequently increasing the resistance of the shock absorber to such separating movements of the frame and axle of the vehicle. This compression of spring 45 occurs as follows:

A portion of the fluid under pressure flowing through duct 42 passes through passage 51, past valve 52 into the storage chamber 50. The fluid under pressure is confined in this chamber, for it cannot escape past valve 56 until it attains a predetermined degree, nor can it escape past the valve head 72, for said valve head normally closes duct 67, consequently the fluid pressure in the storage chamber 50 will build up, moving the piston 58 from the normal position downwardly into said chamber. Each stroke of the piston 28 toward the right tends to build up this pressure within the chamber 50 if one stroke of the piston is insufficient to build up the predetermined pressure. After attaining said predetermined pressure within chamber 50, the fluid will lift valve 56 and thus the fluid pressure is relieved by flow into chamber 53 and thence through passage 55 into the reservoir 25. From this it may be seen that applicants' shock absorber has a storage chamber 50, the fluid pressure of a predetermined degree therein being adapted to be utilized as a motive power for effecting adjustment of the valve 44.

In response to the accelerations of the frame 20 upwardly, caused by the rebounding movement of springs 22 and the upward thrust of axle 21, inertia weight 90 will tend to stand still while the casing 24 is suddenly moved upwardly with frame 20. This results in the movement of valve 70 downwardly so that valve head 71 closes communication between shunt passage 74 and annular space 73 and valve head portion 72 opens communication between duct 67 and the annular passage 73 and consequently with the duct 68. Now the fluid under pressure within chamber 50 may flow through duct 67, annular passage 73 and duct 68 against the piston 46 which forms an abutment for spring 45, actuating said piston 46 toward the valve 44 and thus compressing spring 45 so that it will urge the valve 44 toward duct closing position and, due to such adjustment, said valve 44 will increasingly restrict the flow of fluid from the duct 42 into the chamber 43. In response to such increased restriction the movement of the piston 28 toward the right is resisted to a greater degree and consequently the separating movement of frame 20 and axle 21 is increasingly resisted. From this it may be seen that, in response to accelerations in the movements of the frame 20 upwardly, the inertia mass or weight 90 acting through its valve 72, permits the motive power, or more particularly, the fluid pressure in the storage chamber 50 to be directed to the actuator or piston 46 which adjusts the fluid flow control device 44 to increase its restriction.

In the present invention applicants have provided a shock absorber adapted to be automatically adjusted in accordance with the nature of the road over which the vehicle is being operated, such adjustment being made by a motive power established by the operation of the shock absorber itself, the application of said motive power being controlled automatically by mechanism contained within the shock absorber.

While the form of embodiment as herein disclosed, constitutes a preferred form, it is to be understood that other forms might be adopted, all coming within the scope of the claims which follow.

What is claimed is as follows:

1. An hydraulic shock absorber comprising, in combination, means for circulating fluid within the shock absorber; means for restricting said fluid circulation; means for storing a supply of fluid under pressure; and means adapted in response to acceleration of the shock absorber in one direction, to utilize the fluid pressure in the storage means for adjusting the fluid circulation restricting means to increase its restriction.

2. An hydraulic shock absorber comprising, in combination, means for circulating fluid within the shock absorber; means for restricting said fluid circulation; means for storing fluid under pressure; means for adjusting the fluid circulation restricting means to increase its restriction; and an inertia controlled means for releasing the fluid in the storing means to permit it to actuate the adjusting means in response to accelerations in the movements of the shock absorber upwardly.

3. An hydraulic shock absorber comprising, in combination, means for circulating fluid within the shock absorber; spring loaded means for restricting said fluid circulation; a storage chamber adapted to receive and store fluid under pressure; pressure actuated means for compressing the spring of the spring loaded means; and an inertia controlled means for releasing the fluid within the storage chamber and directing it to the pressure actuated means in response to accelerations in the movements of the shock absorber upwardly.

4. In an hydraulic shock absorber, the combination with a casing providing a cylinder in which a displacement member forms a displacement chamber from which an outlet duct leads to a fluid flow control device which is adapted to control the flow of fluid through said duct; of a reservoir connected to said duct and in which fluid, under pressure, is adapted to be stored; an actuator for adjusting a portion of the fluid flow control device to vary its control of the fluid flow through the duct; and a valve adapted, in response to acceleration in the movement of the shock absorber, to connect the reservoir with the actuator for operating the latter by fluid pressure.

5. An hydraulic shock absorber comprising in combination, a casing providing a cylinder in which a piston forms a fluid displacement chamber having a fluid outlet; a valve normally closing the outlet, but adapted to be operated by fluid pressure to permit a restricted flow of fluid from said outlet; means adapted to be actuated by fluid pressure to increase the restriction of the fluid flow by the valve; a storage chamber adapted to receive and store fluid under pressure; and an inertia valve adapted to connect the storage chamber with the said means in response to accelerations in the movement of the shock absorber vertically.

6. An hydraulic shock absorber comprising, in combination, a casing providing a cylinder in which a piston forms a fluid displacement chamber having an outlet duct; a valve normally closing said duct but adapted to be actuated by fluid pressure to permit a restricted flow of fluid through said duct; a pressure actuated member for adjusting the valve to increase its restriction to fluid flow; a storage chamber adapted to receive and store fluid under pressure, said chamber being connected with the pressure actuated member by a fluid passage; and an inertia actuated valve normally closing said passage but adapted to be actuated in response to accelerations in the movement of the shock absorber vertically to open said passage.

7. An hydraulic shock absorber comprising, in combination, a fluid displacement chamber having an outlet duct; a valve normally closing said duct, but adapted to be actuated by fluid pressure to permit a restricted flow of fluid through said duct; means adapted to be actuated by fluid pressure for adjusting said valve to increase its restriction to fluid flow through the duct; a reservoir in communication with the displacement chamber and the said means, said reservoir being adapted to receive and store fluid under pressure; a valve normally shutting off communication between said reservoir and means; and an inertia control means for actuating the last mentioned valve to connect the said means and reservoir in response to accelerations of the shock absorber movement upwardly.

8. An hydraulic shock absorber comprising, in combination, a fluid displacement chamber having an outlet duct; a spring loaded valve normally closing said duct but adapted, in response to fluid pressure, to permit a restricted fluid flow from said duct; a piston providing an abutment for the spring of the spring loaded valve; a reservoir having passages leading therefrom to the displacement chamber and piston, said reservoir being adapted to receive and store fluid under pressure from the displacement chamber; a valve normally closing the passage leading to the piston; and an inertia control mass adapted to actuate the valve to open said passage in response to accelerations in the upward movements of the shock absorbers for actuating the piston to compress the spring engaging it, whereby the spring loaded valve will increase its restriction to fluid flow.

9. A shock absorber in accordance with claim 5, in which, however, the storage chamber is provided with a spring loaded valve adapted to open and permit fluid to discharge from said chamber after the fluid pressure within said chamber exceeds a predetermined degree.

10. An hydraulic shock absorber comprising in combination, means for circulating fluid in two directions within said shock absorber; means for restricting said fluid circulation; pressure operated means adapted to increase the restriction to fluid circulation in one direction; a pressure chamber adapted to be supplied fluid under pressure from the fluid circulation in one direction only; and an inertia mass controlled valve adapted to connect the pressure chamber with the pressure operated means in response to accelerations in the upward movement of the shock absorber.

11. A shock absorber in accordance with claim 5, in which, however, the storage chamber is provided with an outlet port normally closed by a spring-loaded valve which is adapted to open the port in response to a predetermined fluid pressure within said chamber, said chamber having also a spring-loaded piston adapted to exert a predetermined pressure upon the fluid within the chamber.

12. A shock absorber in accordance with claim 5, in which, however, two valve passages communicate with the storage chamber, one passage permitting fluid to flow into said chamber but preventing the flow of fluid from said chamber, the other passage permitting fluid to flow from said chamber in response to a predetermined fluid pressure within it; and a spring-loaded piston within said chamber for exerting a predetermined pressure upon the fluid therein.

13. A hydraulic shock absorber having fluid circulating means, means for controlling said fluid circulation; a storage chamber adapted to receive and store fluid under pressure; yieldable means in said chamber for exerting a pressure upon the fluid therein; pressure actuated means for adjusting the controlling means; and means responsive to accelerations in the movement of the shock absorber for connecting the pressure actuated means with the storage chamber.

14. A hydraulic shock absorber secured to one of two relatively movable members and adapted to resist the movement between said relatively movable members; means for circulating fluid; fluid flow control devices for regulating said fluid circulation; means for storing fluid under pressure; and means rendered effective in response to accelerations in the movement of the relatively movable member to which the shock absorber is attached for releasing the fluid in the storage means to adjust a fluid flow control device to increase the restriction to the fluid flow.

15. A hydraulic shock absorber adapted to resist the movement between two relatively movable members; means for circulating fluid; spring-loaded fluid flow control devices; a storage chamber for receiving and storing fluid under pressure; pressure actuated means for adjusting the spring pressure on certain of said fluid flow control devices; and means rendered effective by accelerations in the movement of the relatively movable member to which the shock absorber is attached to connect the control device adjusting means with the storage chamber.

CARL H. KINDL.
EDWIN F. ROSSMAN.